(12) United States Patent
Oldenkamp

(10) Patent No.: US 9,071,339 B2
(45) Date of Patent: Jun. 30, 2015

(54) CLOSED-CIRCUIT POWER LINE COMMUNICATION

(75) Inventor: Hendrik Oldenkamp, The Hague (NL)

(73) Assignee: SMA Solar Technology AG, Niestetal (DE)

( * ) Notice: Subject to any disclaimer, the term of this patent is extended or adjusted under 35 U.S.C. 154(b) by 597 days.

(21) Appl. No.: 13/405,736

(22) Filed: Feb. 27, 2012

(65) Prior Publication Data

US 2012/0177133 A1    Jul. 12, 2012

Related U.S. Application Data

(63) Continuation-in-part of application No. PCT/EP2010/061551, filed on Aug. 9, 2010.

(30) Foreign Application Priority Data

Aug. 25, 2009    (EP) .................................... 09168608

(51) Int. Cl.
*H04B 3/00*    (2006.01)
*H04B 3/54*    (2006.01)
*H04B 3/56*    (2006.01)

(52) U.S. Cl.
CPC .. *H04B 3/54* (2013.01); *H04B 3/56* (2013.01); *H04B 2203/5466* (2013.01); *H04B 2203/5445* (2013.01); *H04B 2203/5458* (2013.01)

(58) Field of Classification Search
CPC .................................. H04B 3/54; H04B 3/542
USPC .......................................... 375/257, 219, 340
See application file for complete search history.

(56) References Cited

U.S. PATENT DOCUMENTS

| | | | |
|---|---|---|---|
| 4,992,774 A | 2/1991 | McCullough | |
| 5,257,006 A | 10/1993 | Graham et al. | |
| 6,137,390 A * | 10/2000 | Tung et al. | ...................... 336/83 |
| 7,199,699 B1 | 4/2007 | Gidge | |

FOREIGN PATENT DOCUMENTS

| | | |
|---|---|---|
| EP | 1617538 A1 | 1/2006 |
| WO | 0115334 A1 | 3/2001 |

OTHER PUBLICATIONS

International Search Report Dated Feb. 12, 2010 for International Application No. PCT/EP2010/061551.

* cited by examiner

*Primary Examiner* — Shuwang Liu
*Assistant Examiner* — David S Huang
(74) *Attorney, Agent, or Firm* — Eschweiler & Associates, LLC (57) ABSTRACT

A system for closed-circuit power line communication includes at least a first and second power line connected to at least one electrical device configured to receive a data signal. An auxiliary line is connected to the electrical devices to provide a ground connection, and at least one transmitter generates a first data signal for transmission over the first and second power lines, respectively, to the electrical device. A low-pass common-mode filter is connected to the first and second power lines to provide closed-circuit data communication between the transmitter and the electrical device, the filter comprising at least one coupling capacitor between said first and second power lines such that at least the polarities with respect to ground of said first data signals transmitted over the first and second power lines, respectively, are substantially similar.

20 Claims, 8 Drawing Sheets

CLOSED-CIRCUIT POWER LINE COMMUNICATION

REFERENCE TO RELATED APPLICATIONS

The invention is a continuation-in-part of PCT/EP2010/061551, filed on Aug. 9, 2010, that claims priority to European Patent Application EP 09 168 608.9, filed on Aug. 25, 2009, the contents both of which are hereby incorporated by reference in their entirety.

FIELD

The invention relates to power line communication and, in particular, though not exclusively, to a system for closed-circuit common-mode power line communication and to a common-mode filter, a transmitter and an electrical device for use in such system.

BACKGROUND

Power line communication (PLC) techniques provide an efficient way of using power lines in a power distribution system as data transmission lines. Typically PLC systems provide broadcast-type transmission to a large number of receivers. In such PLC systems data transmission is typically realized using the differential mode of transmission.

In the differential mode a high frequency data signal is superimposed onto the standard 50 Hz or 60 Hz alternating current (AC) signal such that one wire, e.g. the phase line, carries the data signal and the other wire, e.g. the neutral line, carries the inverse of the data signal. Hence, the data signal is symmetric with respect to ground so that the sum of the signals is zero. Differential mode PLC provides good signal propagation and relatively low losses due to electromagnetic radiation.

PLC may also be used for dedicated data transmission applications. In contrast with open broadcast PLC applications, dedicated data transmission applications typically require the data communication to have a closed character in the sense that data communication is only possible between a predetermined number of devices connected to the power lines.

One problem relates to provide effective and reliable isolation between the devices associated with such closed-circuit PLC system and other devices connected to the power lines. Typical differential mode isolation filters require very large inductors and capacitors which are expensive, have large dimensions and/or have a large reactive power component.

Another problem relates to providing a power source for devices connected to such closed-circuit PLC system. The mains may be used as a power source, however this would require the use of a power supply (usually a switched mode power supply) in the electrical device. Many applications require the device to be kept small and cost efficient. The standby energy loss in such a small, low-cost power supply however may be considerable. Moreover the aggregate loss from a large number of such devices may be unacceptable.

Hence there is a need in the prior art for improved methods and systems for providing closed-circuit power line data transmission.

SUMMARY

A first embodiment of the invention may relate to a system for closed-circuit power line communication, wherein the system comprises: at least a first power line and a second power line connected to at least one electrical device configured to receive a data signal. An auxiliary line is connected to the at least one electrical device to provide a ground connection, and at least one transmitter generates a first data signal for transmission over the first power line and the second power line, respectively, to the at least one electrical device. A low-pass common-mode filter is connected to the first power line and the second power line to provide closed-circuit data communication between the transmitter and the electrical device. The filter comprises at least one coupling capacitor between the first power line and the second power line such that at least the polarities with respect to ground of the first data signals transmitted over the first power line and the second power line, respectively, are substantially similar.

Within the same dimensions the increase of the self-inductance provided by the common-mode configuration may be as much as two orders of magnitude, thereby allowing components of smaller dimensions. Further, the impedance of the common mode filter may be two orders higher than its differential equivalent allowing the transmitter to transmit data signals of relatively large amplitude. Moreover, the use of coupling capacitors between the power lines ensure effective coupling of these lines at high frequencies so that the data signals carried by these lines are substantially similar providing a 10 to 20 dB improvement of the attenuation at high frequencies. Further, use of coupling capacitors between the power lines provides improved reproducibility of the attenuation and effective suppression of symmetrical components in the common-mode signal, which may be generated due to the asymmetries in the circuitry. In one embodiment the frequency of said data signal may be selected from the range between 10 kHz and 10 MHz, preferably between 100 kHz and 1 MHz.

In one embodiment the system may further comprise at least one receiver connected to the first power line and/or the second power line. The at least one electrical device is further configured to transmit a second data signal over the first power line and the second power line to the receiver. Hence, the invention allows both uni- and/or bidirectional data communication over the power lines.

In another embodiment the power lines may be further connected to a power distribution system, wherein the filter may be configured to block the first data signals and the second data signals, and pass a power signal transmitted by the power distribution system to the at least one electrical device and/or transmitted by the at least one electrical device to the power distribution system. Low frequency power signals may thus be transmitted to the devices in the closed-circuit PLC system. Further, low frequency power signals generated by the devices, e.g. distributed energy sources such as photovoltaic panels or the like, may be transmitted to the power distribution system.

In yet another embodiment the filter may comprise at least a first inductor and a second inductor connected to the first power line and the second power line, respectively. The first inductor and the second inductor are magnetically coupled by at least a ferromagnetic core. In a further embodiment the ferromagnetic core may comprise a ferromagnetic material having a very high relative magnetic permeability, preferably 1000 or larger. In one embodiment, the ferromagnetic core may be shaped to have an unbroken continuous magnetic path. Such ferromagnetic cores may include circular-shaped cores comprising a hole (e.g. a torus or a toroid core) or square-shaped cores comprising a hole. Square-shaped cores provide the advantage that it provides more space for the windings so that it allows compact design of the inductor.

In one embodiment the filter may comprise at least one bypass capacitor connecting the first power line and/or second power line to the auxiliary line. The inductance of the first inductor and the second inductor may be selected from the range between 0.1 mH and 100 mH, preferably between 1 mH and 10 mH. Further, the capacitance of the bypass capacitor may be selected from the range 1 nF-100 uF, preferably between 10 nF-10 uF.

In one embodiment the data signal carried by the first power line and the second power line respectively may be asymmetrical with regard to the auxiliary line. Hence, in this mode the system may provide common-mode power line communication, which may be especially advantageous in applications wherein the distance between the transmitter and the electrical devices connected to the PLC system is at least smaller than the wavelength associated with the frequency of the data signals.

In another embodiment the data signal carried by the first power line and the second power line respectively may be symmetrical with regard to the auxiliary line. In embodiment, the auxiliary line is connected to at least a reactive element, preferably a mime inductor, such that that the polarity of the data signals carried by the first power line and the second power line have the same polarity and such that the data signals on the first power line and the second power line are opposite to the data signal carried by the auxiliary line. By introducing such inductor in the auxiliary line, the transmission will be differential mode in the sense that the polarity of the signals carried by the power lines are opposite to the polarity of the signal on the auxiliary line connected to ground. Using such differential mode transmission radiative losses may be reduced allowing transmission of data signals over longer distances.

In one embodiment, the transmitter may comprise an amplitude detector coupled to at least one of the first power line or the second power line, and configured to detect the amplitude of a data signal carried by the lines and generate an amplitude signal which is proportional to the amplitude of the detected data signal. The transmitter is configured to use the amplitude signal to control, for example, using a feedback loop, the amplitude of the first data signal generated by the transmitter, for example, the amplitude being controlled between 0.1 and 10 V, more preferably between 0.3 and 3 V.

In yet a further embodiment, the electrical device may be configured to use the first data signal to supply the power associated with the at least one electrical device.

In a further embodiment the input of the at least one electrical device may comprise a further common-mode filter. Such further common-mode filter may be required if the electrical device using the data signal as a power-feed signal has a low input impedance to ground.

As the common-mode filter introduces a high-impedance environment, the transmitter may generate high-voltage amplitude data signals, e.g. 2 V or more. As the amplitude of the data signal is dependent on the common-mode impedance of the power lines (to ground) and the common-mode impedance depends on the number of electrical devices connected to the power lines (which is often not known in advance), the transmitter producing the high-voltage data may be configured to measure the amplitude of the data signal and control the amplitude of the data signal on the measured amplitude.

Such high-voltage data signal controlled by the transmitter may be used by the electronic devices connected to the PLC system as a power-feed signal. The power provided by the high-amplitude data signal may be used by the device to power low-power electronics or a microprocessor or a simple data transmitter associated with an electronic device. A capacitor may be used as an energy buffer to overcome the spaces in the signal and/or to provide the energy to create a return signal. In one embodiment, the at least one electrical device may use the power provided by the data signal to transmit a second data signal over the first power line and the second power line.

In one embodiment at least one of the electrical devices may be a power convertor associated with one or more photovoltaic cells, the power converter comprising at least one transceiver for communicating with the data transmitter and the data receiver.

Other aspects of the invention may relate to a low pass common-mode filter, a transmitter and an electrical device adapted for use in a system as described above.

The invention will be further illustrated with reference to the attached drawings, which schematically will show embodiments according to the invention. It will be understood that the invention is not in any way restricted to these specific embodiments.

DETAILED DESCRIPTION

Figure 1:
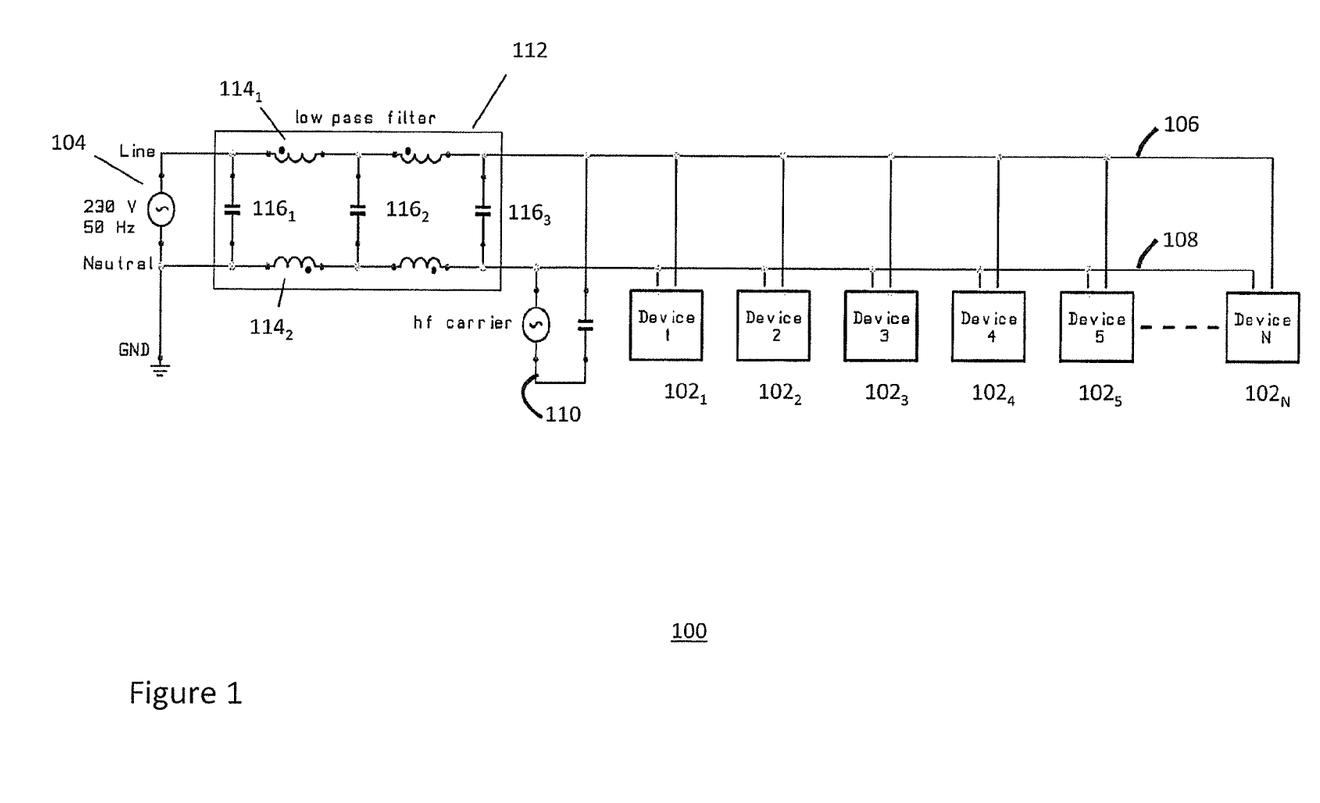
FIG. 1 depicts a PLC system comprising a differential line filter.

FIG. 1 depicts a PLC system 100 for transmitting data over a pair of wires in the differential mode to and from one or more electrical devices $102_1$-$102_N$ comprising a differential line filter. Such devices 102 may include a number of (utility interactive) inverters associated with one or more distributed energy sources such as photovoltaic solar panels and/or wind turbines, a lighting system or any other type of electrical system that requires centrally controlling and feeding multiple devices connected to the power lines.

The devices are connected to a power distribution system 104, e.g. the mains, by a phase line 106 and a neutral line 108. Low frequency, 50 or 60 Hz, AC power signals may be exchanged between the power distribution system and the devices. Further, the devices may be configured to exchange data with a PLC modem 110 connected between the phase and the neutral line. The PLC modem 110 and the devices 102 may comprise a transceiver to enable bi-directional data communication. The data communication between the PLC modem 110 and the devices 102 may be provided at frequencies, that are relatively high with respect to the low-frequency power signals. Typical frequencies of the data signal may be on the order of 100 kHz or higher up into the MHz range.

In the differential mode configuration depicted in FIG. 1, the phase line 106 carries the data signal and the neutral line 108 carries the inverse of the data signal so that the sum of the voltages carried by both lines is zero. Isolation of the data communication between the PLC modem and the devices from the rest of the power distribution system (i.e. closed-circuit communication) may be realized by providing a low-pass, differential power-line filter 112 between the power distribution system 104 and the PLC modem 110 connected to the devices 102. The thus isolated PLC modem 110 and devices 102 may form a closed-circuit differential-mode PLC system. The low-pass filter 112 allows exchange of low-frequency AC power signals between the power distribution system 104 and the devices 102 but blocks high frequency signals. The filter 112 prevents the data signals of the closed-circuit PLC system from entering the power distribution system 104 and high-frequency signals from the power distribution system 104 from interfering with the closed-circuit PLC system.

Such low-pass filter 112 however is difficult to realize in practice. The filter 112 may comprise one or more series inductors $114_1$-$144_4$ in the power lines 106, 108 and parallel capacitors $116_1$-$116_3$ between the power lines 106, 108. As the filter 112 should be able to handle the total current of all the devices 102 within the closed-circuit PLC system, the inductors $114_1$-$114_4$ would require coils of unacceptable large dimensions and large value capacitors (order of a many microfarads) leading to unacceptable values of the reactive power component. Further, the costs related to reactive components of such high values are significant.

Figure 2:
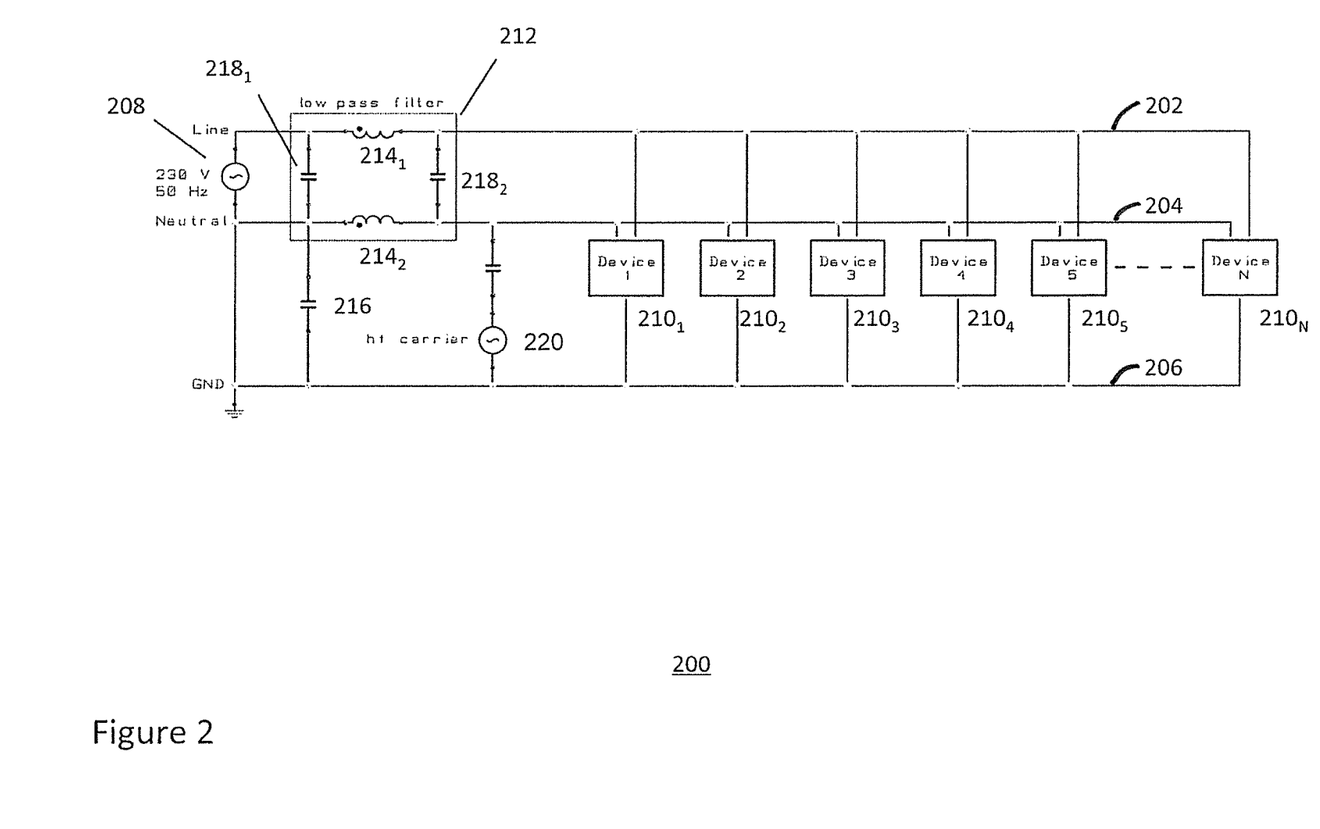
FIG. 2 depicts a schematic of a PLC system according to one embodiment of the invention.

FIG. 2 depicts a schematic of a PLC system 200 according to one embodiment of the invention. In this configuration the phase line 202 and the neutral line 204 are still used for exchanging the low-frequency AC power signal between the power distribution system 208 and the devices $210_1$-$210_N$. However, in contrast with the PLC system in FIG. 1, the PLC modem 220 is now connected to the neutral line and an auxiliary line 206, which may provide a common ground to the devices in the closed-circuit communication system. Further variants include configurations wherein the PLC modem 220 is connected to the phase line 202 and the auxiliary line 206 or to both the neutral line 204 and the phase line 202 and the auxiliary line 206. Contrary to the PLC system in FIG. 1, the PLC system depicted in FIG. 2 provides common-mode data transmission in the sense that the polarity of the data signal on the phase line and the neutral line have the same polarity with respect to ground (i.e. the auxiliary line). In one embodiment, the auxiliary line may be the safety ground line associated with the power distribution system.

A low-pass filter 212 for isolating the devices in the closed-circuit PLC system is configured as a common-mode filter. To that end, a first inline inductor $214_1$ in the phase line 202 and a second inline inductor $214_2$ in the neutral line 204 are coupled as a pair using a ferromagnetic core, comprising a ferromagnetic material that may have a very high permeability such as manganese-zinc or nickel-zinc type ferrites which may have relative magnetic permeability values of 1000 or larger. The ferromagnetic core may be shaped to have an unbroken continuous magnetic path, thereby forming a current compensated choke. Such ferromagnetic cores may include circular-shaped cores comprising a hole (e.g. a torus or a toroid core) or square-shaped cores comprising a hole. A square-shaped core has the advantage that it provides more space for the windings so that it allows compact design of the inductor.

Using the current compensated choke in the common mode configuration, the 50 Hz or 60 Hz low-frequency AC currents exchanged between the power distribution system 208 and the devices 210 compensate each other, thereby allowing the use of magnetic materials with very high relative permeability, e.g. within the range of 1000 or higher, without the problem of saturation the magnetic material due to the 50 or 60 Hz current. This significantly increases the self-inductance of the coils.

When using coils of similar dimensions, similar series resistance and similar maximum current to those used in the system of FIG. 1, the increase of the self-inductance provided by the common-mode configuration may be as much as two orders of magnitude, i.e. 30-100 times larger. Further, using such a current compensated choke in the low-pass filter topology of FIG. 2, the bypass capacitance 216 which is now connected to the auxiliary line 206, may be chosen 30-100 times smaller, thereby rendering the impedance of the common mode filter (which may be calculated from the square root of L/C) 30-100 times higher than its differential equivalent. Such high impedance allows the modem 220 to use data signals of several volts. Such signals may be used to power feed low-power logic or a microcontroller. Such advantageous application will be described hereunder in more detail with reference to FIGS. 5 and 6.

In the PLC system of FIG. 2 the phase line 202 and the neutral line 204 may be capacitively coupled using a first and second coupling capacitor $218_1$, $218_2$. The coupling capacitors 218, having capacitance values in the order of around 10-100 nF, for example, take away the unwanted phase- and amplitude differences which may appear, especially at high frequencies, due to asymmetries in the filter, e.g. impedance differences in the power lines and differences in the self-inductances of the coils and due to the fact that the magnetic coupling between the coils in the choke is smaller than one. Hence, the coupling capacitors ensure effective coupling of the phase line 202 and the neutral line 204 at high frequencies so that the data signals carried by these lines are substantially similar in phase, polarity and amplitude, providing a 10 to 20 dB improvement of the attenuation at high frequencies. Further, it provides improved reproducibility of the attenuation and effective suppression of symmetrical components in the common-mode signal, which may be generated due to the asymmetries in the circuitry as described above.

Figure 3:
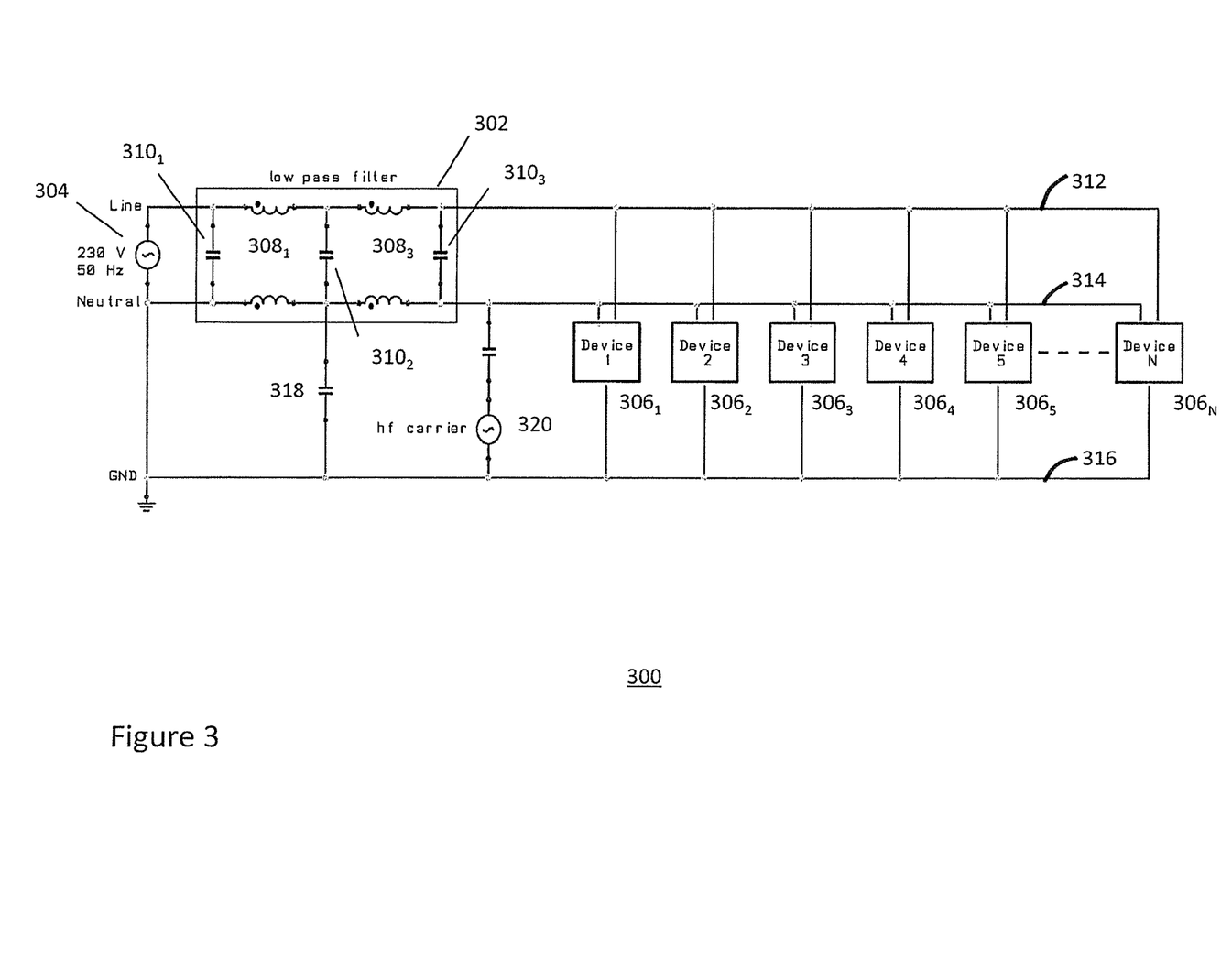
FIG. 3 depicts a schematic of a PLC system according to another embodiment of the invention.

FIG. 3 depicts a closed-circuit common-mode PLC system using a two stage common-mode filter topology 300. The filter 302 isolating the mains 304 from the electrical devices $306_1$-$306_N$ comprises a first common-mode choke $308_1$ in series with a second common-mode choke $308_3$ and three coupling capacitors $310_1$-$310_3$ in parallel for effectively connecting the phase line 312 to the neutral line 314 and improving the attenuation characteristics of the filter. Using typical inductance values in the order of mH and capacitances in the order of around 1-100 nF for the coupling and the bypass capacitor 318 between the neutral line 314 and the auxiliary line 316, an attenuation of 80 dB/oct may be achieved, thereby effectively preventing high-frequency signals originating from the mains entering into the closed-circuit PLC system and vice-versa. In a further embodiment (not shown), a second bypass capacitor may connect the phase line 312 to the auxiliary line 316. In that case, the middle coupling capacitor $310_2$ may be significantly reduced or omitted.

The closed-circuit PLC system as depicted in FIGS. 2 and 3 provides common-mode transmission of data signals between the devices 306 in the system hence radiative losses may appear when transmitting over relatively large distances, i.e. distances larger than the wavelength of the data carrier signal (e.g. around 600 meters at 500 kHz). Typical closed-circuit PLC applications, e.g. in-house and/or local-area network type applications, however only require transmission distances much smaller than the wavelength of the data carrier frequency, typically 50 meters or less.

The filter topologies for use in PLC systems as depicted in FIGS. 2 and 3 allow the use of cheaper and smaller reactive components when compared with a conventional differential low-pass filter solution. The topologies provide well-defined attenuation and allow the high-frequency data signal to be carried by both the phase line 202, 312 and the neutral line 204, 314 so that even when one of the lines is disconnected, e.g. by a defect fuse or the like, data communication to the devices may still be possible. Moreover, as the impedance of the filter 212, 302 is high, it allows the data carrier signal to be used as a power signal for electronic components in the devices 210, 306 connected to the power lines.

Figure 4:
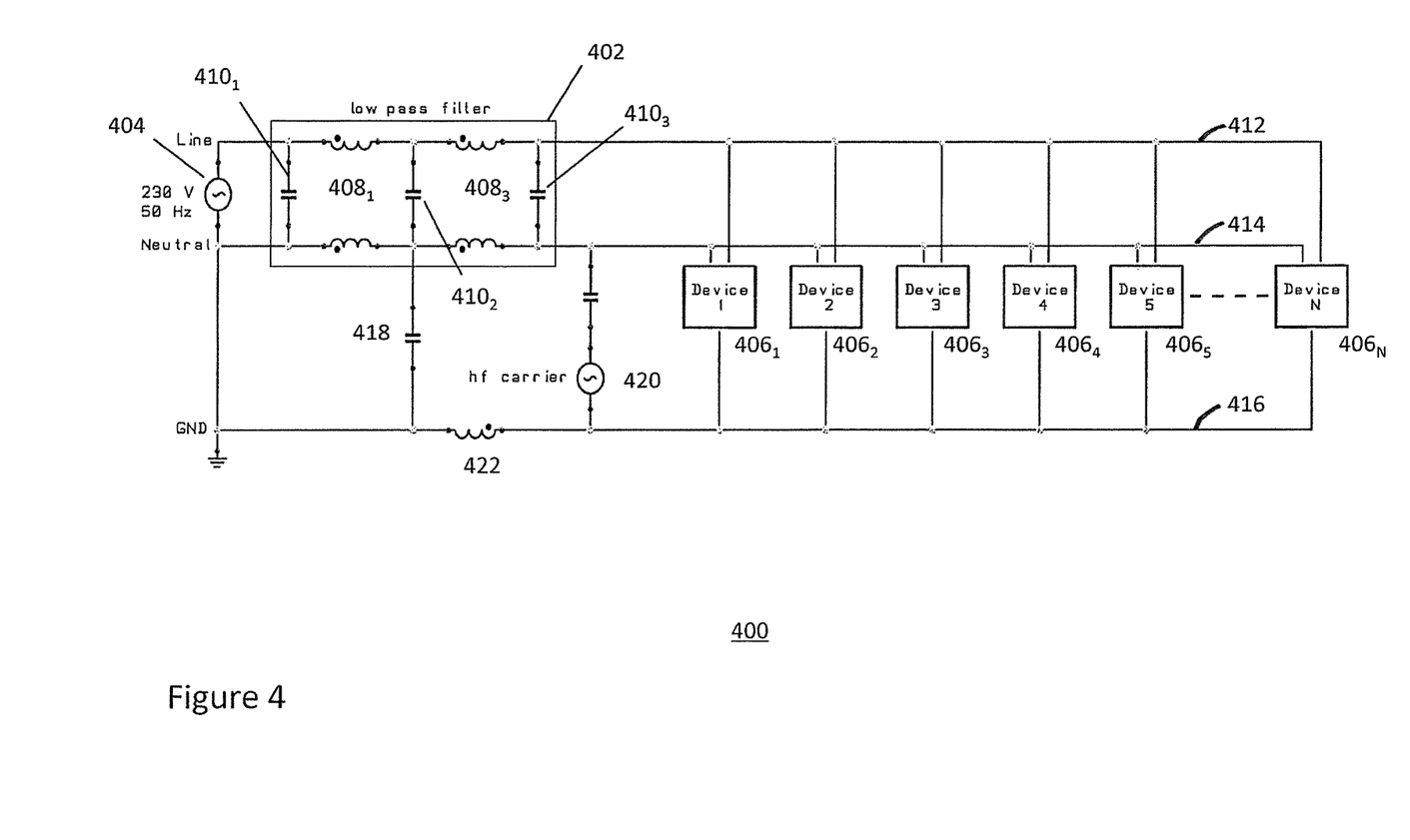
FIG. 4 depicts a schematic of a PLC system according to yet another embodiment of the invention.

If data transmission over larger distances and/or reduction of radiative losses is required, a closed-circuit PLC system as depicted in FIG. 4 may be used. This system is similar to the closed-circuit PLC systems as depicted in FIGS. 2 and 3, however, in this case an inductor 422 is inserted in the auxiliary line 416. Inclusion of an inline inductor 422 and/or other reactive elements in the auxiliary line between the bypass capacitor 418 and the PLC modem 420, may keep the high frequency data signal in the phase line 412 and the neutral line 414 to stay symmetrical with respect to ground. The additional inductor 422 in the auxiliary line 416 does not carry the 50 Hz or 60 Hz AC current signals, so that the dimensions of the inductor 422 may remain well beyond the dimensions of the common-mode filter. If the safety ground line associated with the power distribution system 404 is used as the auxiliary line 416, the inductor 422 should be able to carry for a short period a fault current. Also in that case, the dimensions of the inductor 422 may stay small.

Hence, using an inline inductor 422 in the auxiliary line 416, the closed-circuit common-mode PLC system described with reference to FIGS. 2 and 3 may be modified to a closed-circuit PLC system in which radiative losses may be significantly reduced. The transmission in the system of FIG. 4 may be regarded as a combination of common-mode and differential-mode transmission: common-mode in the sense that the polarity of the data signal on the phase line 412 and the neutral line 414 have the same polarity with respect to ground (i.e. the auxiliary line 416) and differential-mode in the sense that the signals carried by the power lines are opposite to the signal on the auxiliary line connected to ground.

The electrical devices 406 may have non-conductive (see FIG. 4) or electrically conductive housings. If the electrical devices 406 have metal or other electrically conductive housings, the housings may be directly or hard connected to ground, i.e. not via the auxiliary line 416 in which the inline inductor 422 is located. Alternatively, the electrically conductive housings may be connected to the auxiliary line 416, each via a further reactive element, like for example a further inline inductor.

The modem 420 connected in series with a capacitor between the auxiliary line 416 and the power line 414 provides the data signal to be transmitted to the electrical devices 406 symmetrically with respect to ground. For this purpose, the modem 420 may have a grounded center point. For example, the modem 420 may comprise a transformer whose secondary winding is connected between the auxiliary line 416 and the power line 414 and has a grounded center tap. The data signal may then be connected to the primary winding of this transformer for being—with regard to ground—symmetrically applied to the auxiliary line 416 and to the both power lines 414 and 412.

Figure 5:
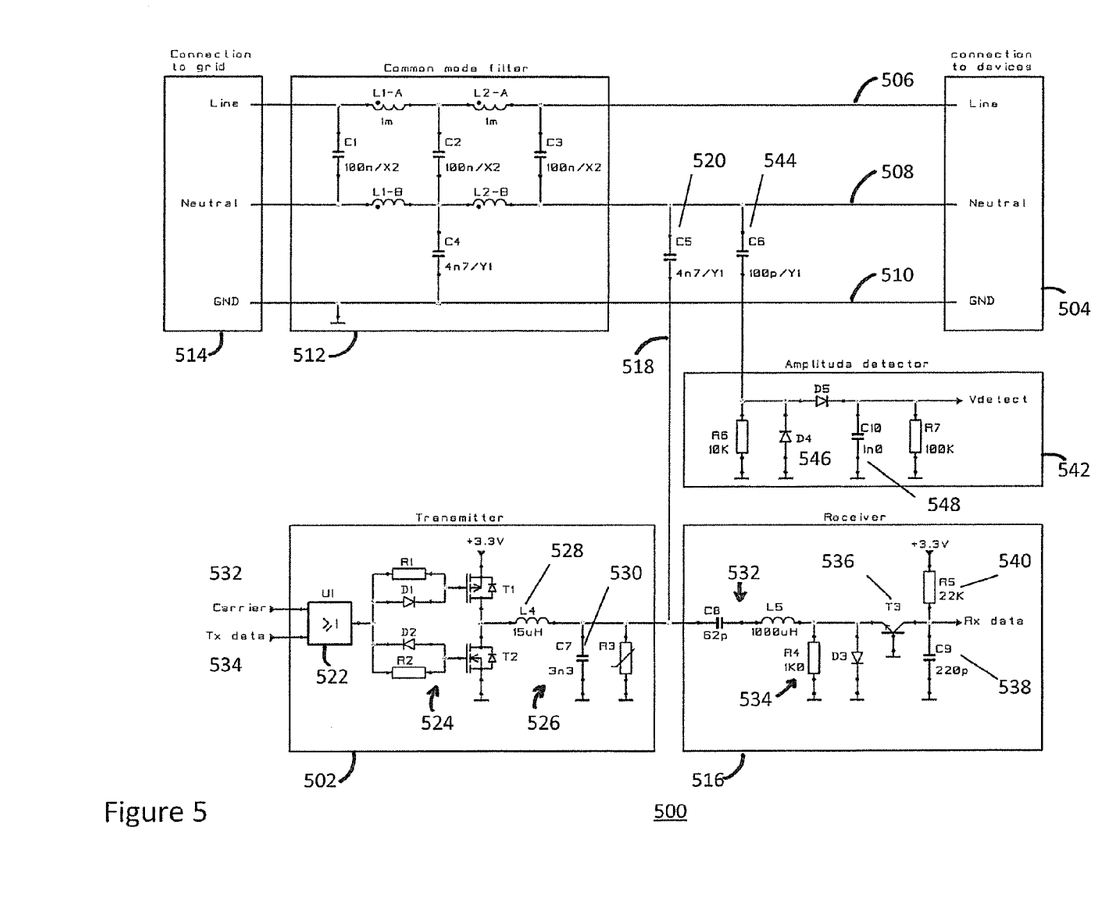
FIG. 5 depicts an exemplary transmitter/receiver system for use in a PLC system according one embodiment of the invention.

FIG. 5 depicts an exemplary transmitter/receiver system 500 for use in a PLC system according one embodiment of the invention. In this embodiment a transmitter 502 is configured to produce a carrier data signal that may be used for power-feeding other electrical devices 504 connected to the power lines 506,508 and the auxiliary line 510. A common-mode filter 512 isolates the mains 514 from the electrical devices in a similar way as explained with reference to FIG. 2-4. The transmitter 502 and the receiver 516 of the transmitter/receiver system are connected via a common line 518 and a capacitor C5 520 to the neutral line 508 of the closed-circuit PLC system. The skilled person will understand that other variants for coupling the transmitter/receiver system to the PLC system are also possible, for example the transmitter/receiver system may be coupled to the phase line 506 or, for example,—in case a three-phase power distribution system is used (not shown)—to a third phase line.

The transmitter comprises a logical OR-port U1 522 connected via mosfet circuit 524 and an LC circuit 526 (formed by inductor L4 528 and capacitor C7 530) to the common line. Logical port U1 comprises a serial data ("Tx data") input 532 and a carrier signal (carrier) input 534, wherein the resonant frequency of the LC circuit approximately matches the frequency of a carrier signal offered to the carrier signal input. The transmitter may be operated in two states depending on the signal offered to the Tx data input of the logical port U1.

A high Tx data input set the transmitter in the rest state ("space"). In that case the output signal of U1 is high so that the N-channel mosfet T2 will connect the inductor of the LC circuit to ground. Hence, in the rest state the LC circuit forms a parallel resonant circuit having a maximum impedance around the frequency of the data carrier signal so that the transmitter will effectively function as a filter for the receiver connected to the transmitter.

A low Tx data input defines the active state ("mark") of the transmitter. In that case the output signal of UI will be the carrier signal, which the mosfet circuit converts to a square wave signal. The resonant frequency of the parallel LC circuit is substantially identical to the frequency of the carrier signal so that the signal over the capacitor 530 of the LC circuit will be approximately sinusoidal. The amplitude of the signal may be varied by varying the duty cycle of the carrier signal Tx data.

The voltage signal over the capacitor C7 of the LC circuit is subsequently coupled into the neutral line 508 and the phase line 506 and transmitted over these lines to the other devices connected to the PLC system. If the series resistance of the first and second mosfet T1, T2 and the inductor 528 and the capacitor 530 of the LC circuit 526 is low, the transmitter may use the mosfet circuit to produce peak voltages over the capacitor 530 that are much larger than the power supply of the mosfet circuit. The transmitter 502 may produce for example a data signal having an effective voltage of 2 V and an associated peak-to-peak value of 5.65 V while the power supply of the circuit is 3.3 V.

The receiver 516 may receive signals transmitted over the phase line 506 and the neutral line 508 via the capacitor C5 520. In that case the transmitter 502 is set in the rest state, thereby functioning as a filter for the receiver. The series LC circuit 532 at the input of the receiver 516 forms a resonant circuit having a minimum impedance at its resonant frequency which is equal to the frequency of the data carrier signal. If the input receives a sufficiently large signal around the data carrier frequency, the voltage over resistor R4 534 will temporarily put transistor T3 536 in its conductive state so that the output of the receiver (the output signal over the output capacitor 538) will be low. If the signal over the resistor R4 534 is not large enough, the transistor T3 will not become conductive. In that case the output capacitor 538 will be charged via resistor R5 540 so that the output of the receiver will be high. In order to provide proper functioning of the follower circuit, the time constant defined by the resistance R5 and the output capacitor C9 must be larger than the period of the data carrier signal and smaller than the time period associated with a data bit in the data carrier signal.

The transmitter will couple the data signal into the neutral line 508 using the capacitor 520, which constitutes a series impedance for the transmitted data signal. Hence, the amplitude of the data signal carried by the power lines will depend on the common mode impedance to ground of the power lines. The common mode impedance however depends on the number and type of devices connected to the power lines and thus is not known in advance. The transmitter/receiver system may therefore use an amplitude detector 542 connected via a capacitor C6 544 to the power line. The amplitude detector 542 is used for determining the peak voltage of the carrier signal. To that end it comprises a diode circuit 546 and a small detection capacitor 548. The voltage signal $V_{det}$ over the detection capacitor 548 is approximately equal to the peak voltage of the carrier signal (minus the voltage drop across diodes D4 and D5) and may be used to adjust the duty cycle of the carrier signal that is fed to the transmitter 502. This way it is possible determine how many devices are connected to the closed-circuit PLC system. Further, the voltage signal $V_{det}$ over the detection capacitor 548, representing the actual amplitude of the data signal carried by the power lines, may be used by the transmitter 502 in a feedback loop in order to control the amplitude of the data signal used by the transmitter.

Figure 6:
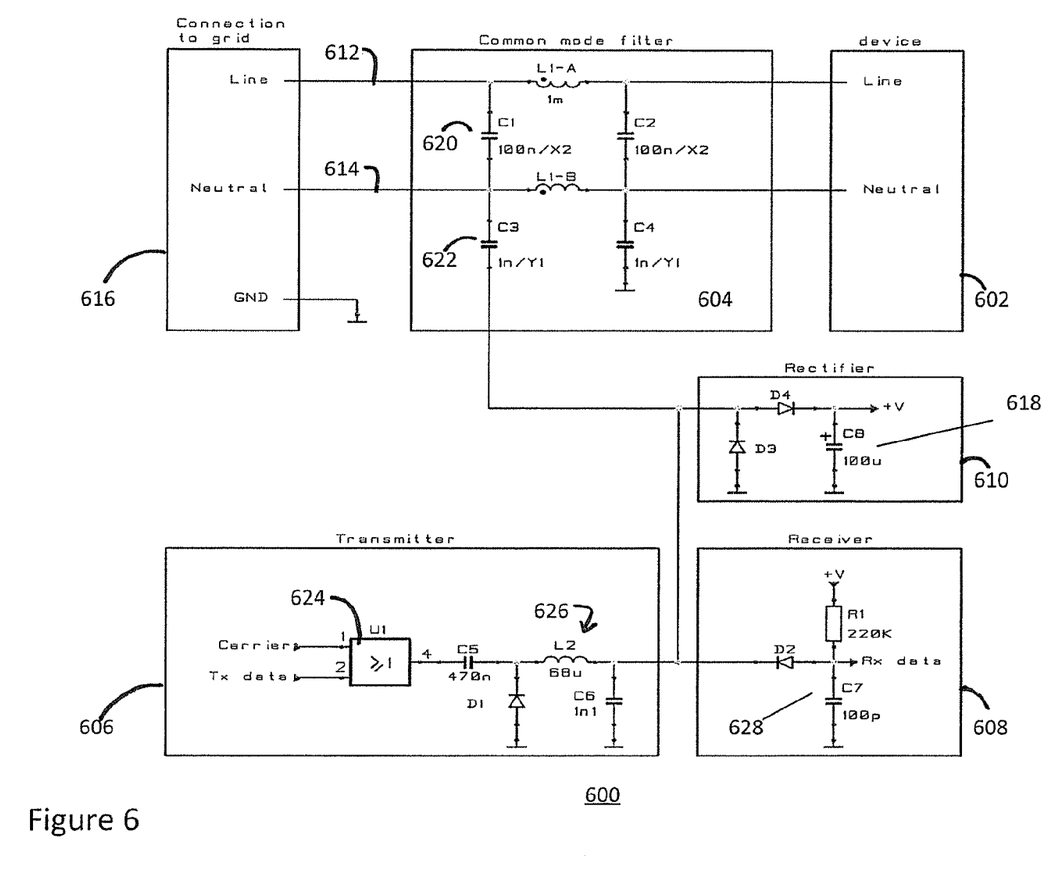
FIG. 6 depicts an electrical system configured for using a data signal as a power-feeding signal according to one embodiment of the invention.

FIG. 6 depicts an electrical system 600 configured to use a data signal, for example a data signal as generated by the transmitter/receiver system as depicted in FIG. 5, as a power-feeding signal according to one embodiment of the invention. Such electrical system may be part of a control device for centrally controlling and feeding multiple devices connected to the power lines. Typical applications may related to the control of distributed power source applications such as photovoltaic panels, (LED) lighting devices, climate control devices, etc.

The system may comprise an electrical device 602 and a common-mode filter 604, a transmitter 606, a receiver 608 and a rectifier 610 which are associated with the device and connected to the power lines 612, 614. The power lines may be connected to a PLC system 616, for example, a PLC system configured to provide a large-amplitude data signal as described with reference to FIG. 5.

The low-pass common-mode filter 604 may provide a high impedance environment for the data signal so that the data signal on the power line may be fed to the rectifier 610 formed by a first D3 and second diode D4. The diodes charge a capacitor C8 618 having a capacitance value so that it may power the transmitter 606 for the time period required to sent a data signal back. Alternatively, or in addition, the charging capacitor 618 may also power other components in the electrical system. If the impedance to ground of the electrical device is sufficiently high, the common mode filter 604 may not be required and the capacitances C1 620 and C3 622 will suffice.

The transmitter 606 associated with the electrical system 600 may have a similar input port as described with reference to FIG. 5. As the data signal generated by the transmitter 606 does not need to power-feed other devices connected to the power lines, the transmitter may generate a low amplitude, for example 0.5 V, data signal for which no mosfet circuit is required. Further no amplitude control is required so that the carrier signal at the input of the logical port U1 624 may have a fixed duty cycle of 50 percent. Further, transmitter 606 may comprise a parallel resonant circuit 626 formed by inductor L2 and capacitor C6 and functioning as the receiver filter. As the amplitude of the received data signal is large, the data signal may be directly reconstructed using a simple circuit comprising a diode D2, resistor R1 and an output capacitor C7 628.

The data carrier signal is thus used for both transmitting control information to the electrical device and to efficiently power-feed one or more devices in the PLC system. Such a power-feeding scheme eliminates the need for a power supply for transforming the mains power signal to a low-power signal suitable for use by the electrical device and/or communications devices, e.g. a data transmitter/receiver, associated with the electrical device.

Figure 7:
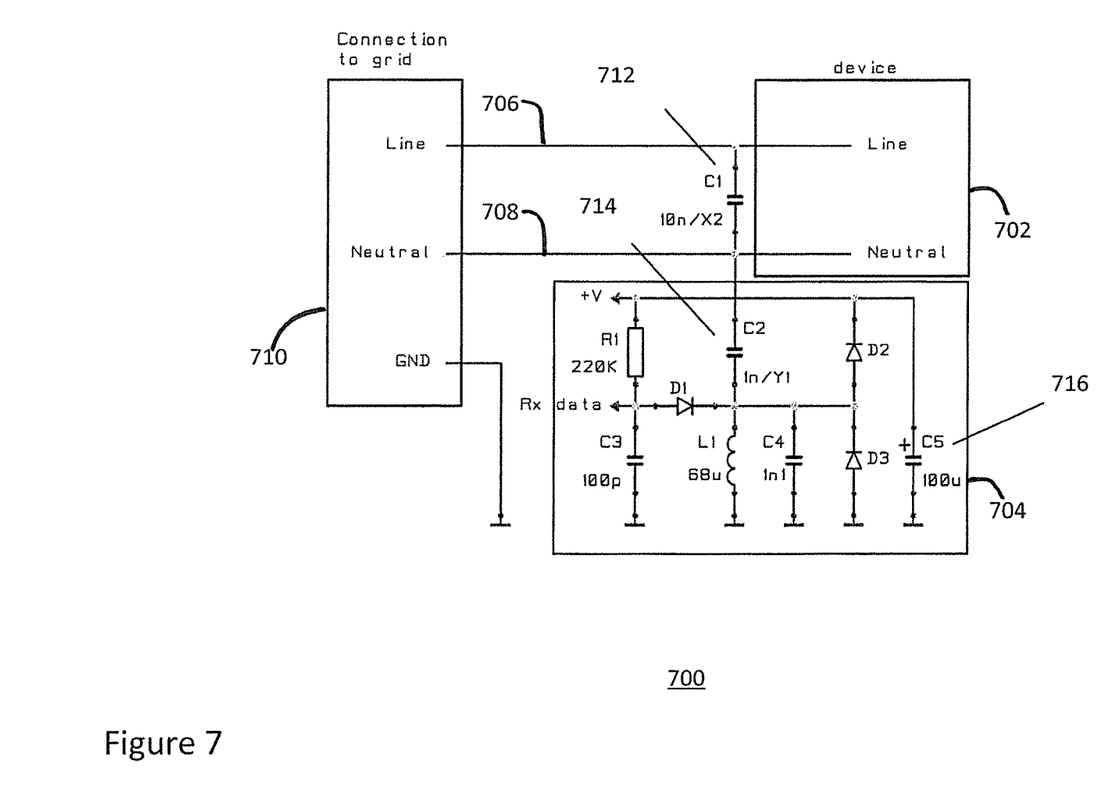
FIG. 7 depicts an electrical system configured for using a data signal as a power-feeding signal according to another embodiment of the invention.

When an electrical device only requires to "listen", i.e. to receive, a data signal the electrical system in FIG. 6 may be simplified. One possible configuration is depicted in FIG. 7. The electrical system 700 comprises an electrical device 702 and an associated receiver 704 connected via power lines 706, 708. The power lines may be connected to a PLC system 710, for example, a PLC system configured for providing a large-amplitude data signal as described with reference to FIG. 5.

In the configuration of FIG. 7 it is assumed that the impedance to ground of the electrical device is high enough for allowing the data signal to be coupled out of the power lines using two capacitors C1 712 and C2 714. The data signal may charge charging capacitor C5 716, which may subsequently power a simple follower circuit comprising a diode D1 resistor R1 and an output capacitor C3 for reconstructing the data signal Rx data. The simple and cost-effective design of the electrical system in FIG. 7 may be advantageous in applications that require central power-feed and control, for example controllers for (LED) lighting, ventilation, electrical window shutters and climate control devices.

Figure 8:
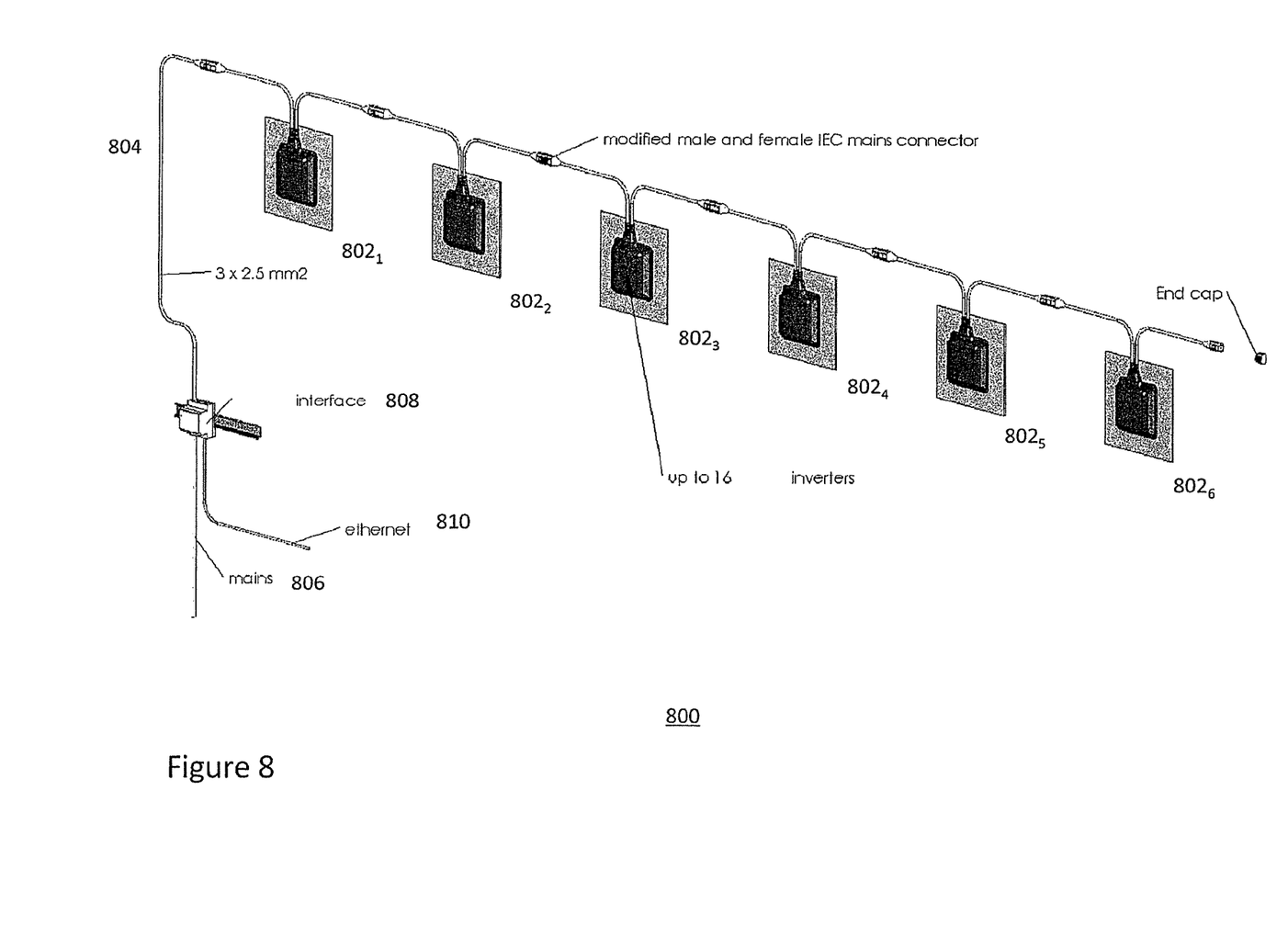
FIG. 8 depicts a photovoltaic system using a PLC system according to one embodiment of the invention.

In one embodiment the invention may be used for data communication between so-called distributed energy sources. Energy sources such as solar cells and/or wind turbines or the like may be connected to the power lines of a local-area power line network. FIG. 8 depicts an example of such application. In particular, FIG. 8 schematically depicts part of a photovoltaic system 800 using a PLC system according to the invention. The photovoltaic system may comprise one or more photovoltaic panels, each comprising a number of photovoltaic (PV) cells and each comprising a DC/AC converter (inverter) $802_1$-$802_6$ for converting the light-induced DC voltage into an AC voltage and for keeping the PV module in its optimum working point. The inverters of each PV module in the PV panel may be connected via a pair of power lines and an auxiliary line 804 to the mains 806.

One or more inverters in the PV panel may use the power lines for communicating with a central PV controller 808, which may be located locally at the site where the PV panels are installed. In this particular scheme, the PV panels in the photovoltaic system may deliver (during daylight operation) solar power produced by the PV cells to the mains and at the same time use the wiring of the mains for data communication. During the night, the control electronics or part thereof may be powered by the data carry signal in a way as described by reference to FIGS. 5-7. This avoids the need for an internal power supply and eliminates the associated standby losses and costs.

In order to allow PLC communication both the PV controller and the one or more inverters of the PV cell may comprise a data transmitter and/or receiver for data communication over the power lines. The communication between of the PV controller and the PV cells may be advantageously implemented as closed-circuit PLC system as described with reference to FIGS. 2-7. The PV controller may comprise a low-pass common-mode filter isolating the PV panel from the mains. Such a closed-circuit system allows the inverters to send sensory data and/or operational data such as produced power, cell characteristics, etc. to the PV controller and to receive control data (e.g. software updates, device settings, etc.) from the PV controller using the existing wiring of the mains to which the PV panels are connected. Further, the PV controller may comprise an interface with other communication networks such as an Ethernet interface 810 for providing data communication with a central control system (not shown).

It is to be understood that any feature described in relation to any one embodiment may be used alone, or in combination with other features described, and may also be used in combination with one or more features of any other of the embodiments, or any combination of any other of the embodiments. Moreover, further series inline inductors and/or capacitors may be added to the common-mode filter topology to improve the filter characteristics. Further equivalents and modifications not described above may also be employed without departing from the scope of the invention, which is defined in the accompanying claims. For example, although the embodiments of FIGS. 2-8 are described with reference to a single phase electrical power distribution system, it is understood by the skilled person that the invention may also be used with other electrical power distribution systems such as a two- or a three phase electrical power distribution system.

The invention claimed is:

1. A system for closed-circuit power line communication, comprising:
    at least a first power line and a second power line connected to at least one electrical device configured to receive a data signal;
    an auxiliary line connected to the at least one electrical device, and configured to provide a ground connection;
    at least one transmitter configured to generate first data signals for transmission over the first power line and the second power line, respectively, to the at least one electrical device; and
    a low-pass common-mode filter connected to the first power line and the second power line, and configured to provide closed-circuit data communication between the transmitter and the at least one electrical device, wherein the low-pass common-mode filter comprises at least one coupling capacitor between the first power line and the second power line such that at least the polarities with respect to ground of the first data signals transmitted over the first power line and the second power line, respectively, are substantially similar,
    wherein the first data signals carried by the first power line and the second power line, respectively, are asymmetrical with respect to the auxiliary line.

2. The system according to claim 1, further comprising at least one receiver connected to the first power line and/or the second power line, wherein the at least one electrical device is further configured to transmit second data signals over the first power line and the second power line to the receiver,
    wherein the first power line and the second power line are further connected to a power distribution system, and wherein the low-pass common-mode filter is configured to block the first data signals and the second data signals, and pass a power signal transmitted by the power distribution system to the at least one electrical device and/or pass a power signal transmitted by the at least one electrical device to the power distribution system,
    wherein the low-pass common-mode filter comprises at least a first inductor and a second inductor connected to the first power line and the second power line, respectively, the first inductor and the second inductor being magnetically coupled by a ferromagnetic core that is shaped to have an unbroken continuous magnetic path, and wherein the ferromagnetic core comprises a magnetic material of a relative magnetic permeability of at least 1000, and
    wherein the low-pass common-mode filter comprises at least one bypass capacitor connecting the first power line and/or the second power line to the auxiliary line.

3. The system according to claim 1, further comprising an amplitude detector coupled to at least one of the first power line or the second power line, and configured to detect an amplitude of a data signal carried by the first power line or the second power line, and generate an amplitude signal which is proportional to the detected amplitude, the transmitter configured to use the amplitude signal to control an amplitude of the first data signals generated by the transmitter.

4. The system according to claim 1, wherein the electrical device is configured to receive the first data signals transmitted over the first power line and the second power line, the electrical device further being configured to use the first data signals to charge a power source associated with the electrical device.

5. The system according to claim 4, wherein the power source is used to transmit a second data signal over the first power line and the second power line.

6. A system for closed-circuit power line communication, comprising:
    at least a first power line and a second power line connected to at least one electrical device configured to receive a data signal;
    an auxiliary line connected to the at least one electrical device, and configured to provide a ground connection;
    at least one transmitter configured to generate first data signals for transmission over the first power line and the second power line, respectively, to the at least one electrical device; and
    a low-pass common-mode filter connected to the first power line and the second power line, and configured to provide closed-circuit data communication between the transmitter and the at least one electrical device, wherein the low-pass common-mode filter comprises at least one coupling capacitor between the first power line and the second power line such that at least the polarities with respect to ground of the first data signals transmitted over the first power line and the second power line, respectively, are substantially similar,
    wherein the first data signals carried by the first power line and the second power line, respectively, are symmetrical with respect to the auxiliary line, and
    wherein the auxiliary line is connected to at least a reactive element, such that that a polarity of the first data signals carried by the first power line and the second power line have the same polarity and such that the first data signals on the first power line and the second power line are opposite in polarity to the first data signals carried by the auxiliary line.

7. The system according to claim 6, further comprising an amplitude detector coupled to at least one of the first power line or the second power line, and configured to detect an amplitude of a data signal carried by the first power line or the second power line, and generate an amplitude signal which is proportional to the detected amplitude, the transmitter configured to use the amplitude signal to control an amplitude of the first data signals generated by the transmitter.

8. The system according to claim 6, wherein the electrical device is configured to receive the first data signals transmitted over the first power line and the second power line, the electrical device further being configured to use the first data signals to charge a power source associated with the electrical device.

9. The system according to claim 6, further comprising at least one receiver connected to the first power line and/or the second power line, wherein the at least one electrical device is further configured to transmit second data signals over the first power line and the second power line to the receiver,
wherein the first power line and the second power line are further connected to a power distribution system, and wherein the low-pass common-mode filter is configured to block the first data signals and the second data signals, and pass a power signal transmitted by the power distribution system to the at least one electrical device and/or pass a power signal transmitted by the at least one electrical device to the power distribution system,
wherein the low-pass common-mode filter comprises at least a first inductor and a second inductor connected to the first power line and the second power line, respectively, the first inductor and the second inductor being magnetically coupled by a ferromagnetic core that is shaped to have an unbroken continuous magnetic path, and wherein the ferromagnetic core comprises a magnetic material of a relative magnetic permeability of at least 1000, and
wherein the low-pass common-mode filter comprises at least one bypass capacitor connecting the first power line and/or the second power line to the auxiliary line.

10. A system for closed-circuit power line communication, comprising:
at least a first power line and a second power line connected to at least one electrical device configured to receive a data signal;
an auxiliary line connected to the at least one electrical device, and configured to provide a ground connection;
at least one transmitter configured to generate first data signals for transmission over the first power line and the second power line, respectively, to the at least one electrical device; and
a low-pass common-mode filter connected to the first power line and the second power line, and configured to provide closed-circuit data communication between the transmitter and the at least one electrical device, wherein the low-pass common-mode filter comprises at least one coupling capacitor between the first power line and the second power line such that at least the polarities with respect to ground of the first data signals transmitted over the first power line and the second power line, respectively, are substantially similar,
wherein the electrical device is configured to use the first data signals to charge a capacitor.

11. The system according to claim 10, wherein the electrical device is configured to use electrical power associated with the charged capacitor to transmit a second data signal over the first power line and the second power line.

12. The system according to claim 10, further comprising an amplitude detector coupled to at least one of the first power line or the second power line, and configured to detect an amplitude of a data signal carried by the first power line or the second power line, and generate an amplitude signal which is proportional to the detected amplitude, the transmitter configured to use the amplitude signal to control an amplitude of the first data signals generated by the transmitter.

13. The system according to claim 10, wherein the electrical device is configured to receive the first data signals transmitted over the first power line and the second power line, the electrical device further being configured to use the first data signals to charge a power source associated with the electrical device.

14. The system according to claim 10, further comprising at least one receiver connected to the first power line and/or the second power line, wherein the at least one electrical device is further configured to transmit second data signals over the first power line and the second power line to the receiver,
wherein the first power line and the second power line are further connected to a power distribution system, and wherein the low-pass common-mode filter is configured to block the first data signals and the second data signals, and pass a power signal transmitted by the power distribution system to the at least one electrical device and/or pass a power signal transmitted by the at least one electrical device to the power distribution system,
wherein the low-pass common-mode filter comprises at least a first inductor and a second inductor connected to the first power line and the second power line, respectively, the first inductor and the second inductor being magnetically coupled by a ferromagnetic core that is shaped to have an unbroken continuous magnetic path, and wherein the ferromagnetic core comprises a magnetic material of a relative magnetic permeability of at least 1000, and
wherein the low-pass common-mode filter comprises at least one bypass capacitor connecting the first power line and/or the second power line to the auxiliary line.

15. A closed-circuit power line communication system, the communication system comprising:
a first power line and a second power line connected to at least one electrical device configured to receive a data signal;
an auxiliary line connected to the at least one electrical device and configured to provide a ground connection;
a transmitter configured to generate the data signal and apply the data signal between the auxiliary line and the first power line for transmission to the at least one electrical device; and
a low-pass common-mode filter connected to the first power line and the second power line and configured to provide closed-circuit data communication between the transmitter and the at least one electrical device,
wherein the auxiliary line is connected to a predetermined potential via at least one reactive element,
wherein the data signal comprises a first data signal component transmitted over the first power line, a second data signal component transmitted over the second power line, and a third data signal component transmitted over the auxiliary line; and
wherein the polarities of the first data signal component and of the second data signal component are equal, and wherein polarities of the first data signal component and the second data signal component are opposite to a polarity of the third data signal component.

16. The power line communication system according to claim 15, wherein the low-pass common-mode filter comprises at least one coupling capacitor between the auxiliary line and the first power line.

17. The power line communication system according to claim 16, wherein the low-pass common-mode filter further comprises at least one coupling capacitor between the first power line and the second power line.

18. The power line communication system according to claim 16, wherein the low-pass common-mode filter further comprises at least one coupling capacitor between the auxiliary line and the second power line.

19. The power line communication system according to claim 15, wherein the at least one reactive element comprises an inline inductor.

20. The power line communication system according to claim 15, further comprising a modem configured to provide the data signal at high frequencies, wherein the modem is coupled in series with at least one capacitor, and is connected between the auxiliary line and the first power line.

* * * * *